United States Patent [19]

Weller et al.

[11] Patent Number: 5,698,645

[45] Date of Patent: Dec. 16, 1997

[54] PROCESS FOR PREPARING CYCLOOLEFIN COPOLYMERS

[75] Inventors: Thomas Weller, Mainz; Frank Osan, Kelkheim; Frank Küber, Oberursel; Michael Aulbach, Hofheim, all of Germany

[73] Assignee: Hoechst Aktiengesellschaft, Frankfurt, Germany

[21] Appl. No.: 796,312

[22] Filed: Feb. 7, 1997

Related U.S. Application Data

[63] Continuation of Ser. No. 619,117, Mar. 20, 1996, abandoned, which is a continuation of Ser. No. 493,886, Jun. 23, 1995, abandoned.

[30] Foreign Application Priority Data

Jun. 24, 1994 [DE] Germany ............ 44 22 157.6

[51] Int. Cl.⁶ ............... C08F 4/64; C08F 232/04
[52] U.S. Cl. .............. 526/160; 526/165; 526/281; 526/308; 526/943
[58] Field of Search ............... 526/160, 165, 526/281, 308, 943, 170

[56] References Cited

U.S. PATENT DOCUMENTS

| | | |
|---|---|---|
| 5,003,019 | 3/1991 | Ishimaru et al. ............ 526/281 |
| 5,087,677 | 2/1992 | Brekner et al. ............ 526/160 |
| 5,272,235 | 12/1993 | Wakatsuru et al. ............ 232/4 |
| 5,324,801 | 6/1994 | Brekner et al. ............ 526/281 X |
| 5,371,158 | 12/1994 | Brekner et al. ............ 526/127 |
| 5,422,409 | 6/1995 | Brekner et al. ............ 526/281 |

FOREIGN PATENT DOCUMENTS

| | | |
|---|---|---|
| 0 283 164 | 9/1988 | European Pat. Off. . |
| 0 283 164 B1 | 9/1988 | European Pat. Off. ...... C08F 210/00 |
| 0283164 | 9/1988 | European Pat. Off. ............ 526/281 |
| 0 407 870 A2 | 1/1991 | European Pat. Off. . |
| 0 447 072 A2 | 9/1991 | European Pat. Off. ...... C08F 210/02 |
| 0 485 893 A1 | 5/1992 | European Pat. Off. . |
| 0 503 422 A1 | 9/1992 | European Pat. Off. . |

*Primary Examiner*—Fred Teskin
*Attorney, Agent, or Firm*—John M. Genova

[57] ABSTRACT

A process for preparing a cycloolefin copolymer by polymerization of at least one cycloolefin and at least one acyclic olefin in the presence of a catalyst which contains at least one cocatalyst and at least one metal-locene of the formula (I)

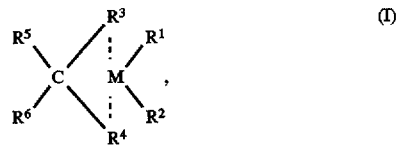

11 Claims, No Drawings

PROCESS FOR PREPARING CYCLOOLEFIN COPOLYMERS

This is a Continuation of application Ser. No. 08/619,117 filed on Mar. 20, 1996, abandoned, which is a continuation of Ser. No. 08/493,886, filed on Jun. 23, 1995, now abandoned.

DESCRIPTION

The present invention relates to a process for preparing transparent cycloolefin copolymers (COCs) having high tensile strengths and high viscosity numbers.

Processes for copolymerizing cyclic olefins with alpha-olefins by means of metallocene catalyst systems are known (EP 283 164, EP 447 072, EP 407 870). The polymerization of the cycloolefins here proceeds with retention of the rings and can be carried out in solvents or in bulk. Suitable solvents are, for example, hydrocarbons. The cycloolefin copolymers have a high thermal shape stability and it is possible to use the polymers as thermoplastic molding compositions.

Depending on the application, different demands are placed on the melt viscosity of the polymer. For injection-molding applications, lower melt viscosities are required than for extrusion applications. For a given comonomer composition and processing temperature, the melt viscosity of the cycloolefin copolymers rises with the mean molecular weight. A measure of the mean molecular weight is, for example, the viscosity number. Quite generally, it is desirable to be able to control the viscosity number within as wide as possible a range. According to the prior art, the viscosity number of cycloolefin copolymers is controlled mainly by metering in of hydrogen and, insofar as it is technically feasible, by variation of the reaction temperature. To lower the viscosity number, either hydrogen regulation can be used or the polymerization temperature can be increased. In contrast, the viscosity number can only be increased by lowering the temperature. However, there are technical limits to the lowering of temperature, since at lower reaction temperatures the constancy of temperature over time is no longer ensured. This can be attributed to the fact that the efficiency of the cooling rises with the temperature difference between polymerization and cooling temperature. Since, for economic reasons, river water is preferably used for cooling, a polymerization process which proceeds below about 35° C. can no longer be economically cooled. Furthermore, at low polymerization temperatures the activity of the catalyst and thus the reaction rate are reduced too far. The prerequisite for a wide, accessible viscosity number range is thus that the process gives, from the beginning, cycloolefin copolymers having a high viscosity number which can then, if desired, be lowered by suitable measures. In addition, it is desirable to achieve high tensile strengths and space-time yields.

It is therefore an object of the present invention to find a process which makes possible the preparation of cycloolefin copolymers having high tensile strengths and high viscosity numbers and makes possible high space-time yields.

It has been found that this object can be achieved by use of specific metallocenes.

The present invention accordingly provides a process for preparing a cycloolefin copolymer by polymerization of at least one cycloolefin and at least one acyclic olefin in the presence of a catalyst which contains at least one cocatalyst and at least one metallocene of the formula (I)

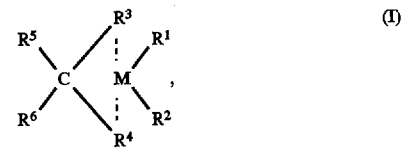

where M is a metal of the group IVb, Vb or VIb of the Periodic Table of the Elements, $R^1$ and $R^2$ are identical or different and are each a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a halogen atom or a trifluorosulfonic acid radical, $R^3$ and $R^4$ are identical and are each a monocyclic or polycyclic hydrocarbon radical which can form a sandwich structure with the transition metal, and $R^5$ and $R^6$ are identical or different and are each a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a $C_1$–$C_{10}$-haloalkyl group, a $NR^7{}_2$—, —$PR^7{}_2$—, —$P(O)R^7{}_2$—, —$AsR^7{}_2$— or $SR^7$— radical, where the radicals $R^7$ are identical or different and are each a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a halogen atom or a trifluoromethylsulfonic acid group.

In the process of the invention, preference is given to using from 0.1 to 99.9% by weight, based on the total amount of monomers, of at least one polycyclic olefin of the formulae I, II, III, IV, V, VI or VII

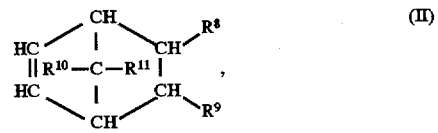

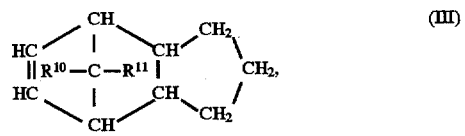

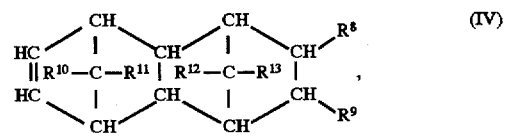

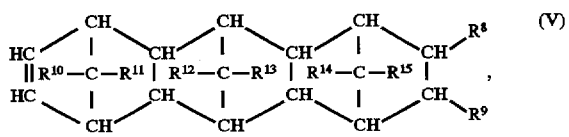

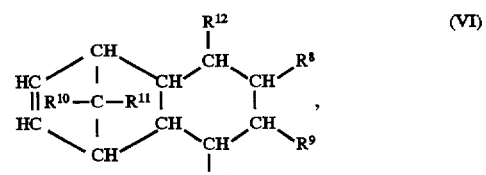

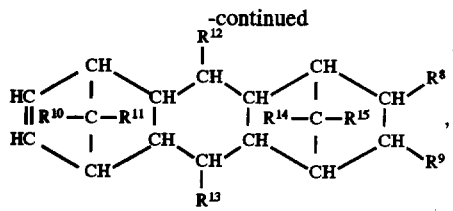

where $R^8$, $R^9$, $R^{10}$, $R^{11}$, $R^{12}$, $R^{13}$, $R^{14}$ and $R^{15}$ are identical or different and are each a hydrogen atom or a hydrocarbon radical which preferably has 1-20 carbon atoms, such as $C_6$–$C_{10}$-aryl or $C_1$–$C_8$-alkyl, with identical radicals in the various formulae being able to have different meanings, from 0 to 99.9% by weight, based on the total amount of monomers, of a monocyclicolefin of the formula VIII

where n is a number from 2 to 10, and from 0.1 to 99.9% by weight, based on the total amount of monomers, of at least one acyclic olefin of the formula IX

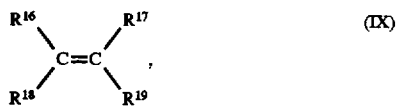

where $R^{16}$, $R^{17}$, $R^{18}$ and $R^{19}$ are identical or different and are each a hydrogen atom or a hydrocarbon radical which preferably has 1-20 carbon atoms, such as $C_6$–$C_{10}$-aryl or $C_1$–$C_8$-alkyl.

In the process of the invention, preference is given to using a cycloolefin of the formula II or IV where $R^8$, $R^9$, $R^{10}$, $R^{11}$, $R^{12}$, $R^{13}$, $R^{14}$ and $R^{15}$ are identical or different and are each a hydrogen atom or a $C_1$–$C_{20}$-hydrocarbon radical, preferably a $C_6$–$C_{10}$-aryl radical or a $C_1$–$C_8$-alkyl radical, with identical radicals in the various formulae being able to have different meanings.

If desired, a monocyclic olefin of the formula VIII

where n is a number from 2 to 10 is also used. Among the cycloolefins of the formula VIII, preference is given to cyclopentene, which can be substituted.

Furthermore, preference is given to using an acyclic 1-olefin of the formula IX

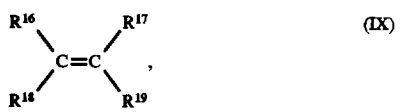

where $R^{16}$, $R^{17}$, $R^{18}$ and $R^{19}$ are identical or different and are each a hydrogen atom or a $C_1$–$C_{20}$-hydrocarbon radical, preferably a $C_6$–$C_{10}$-aryl radical and a $C_1$–$C_8$-alkyl radical. Preference is here given to ethylene and propylene.

In particular, copolymers of polycyclic olefins, preferably of the formulae II and IV, with ethylene are prepared.

Particularly preferred polycyclic olefins are norbornene and tetracyclododecene, where these can each be substituted by ($C_1$–$C_6$)-alkyl. They are preferably copolymerized with ethylene; particular importance is attached to ethylene/norbornene copolymers.

The polycyclic olefin is used in an amount of from 0.1 to 99.9 mol %, preferably 40–75 mol %, and the acyclic olefin is used in an amount of from 0.1 to 99.9 mol %, preferably 20–60 mol %, in each case based on the total amount of monomers.

The concentration of the acyclic olefin is given by its solubility in the reaction medium at the given pressure and given temperature.

For the purposes of the present invention, polycyclic olefins, monocyclic olefins and acyclic olefins include mixtures of two or more olefins of the respective type. This means that the process of the invention can be used to prepare not only polycyclic bicopolymers but also tercopolymers and multicopolymers.

The catalyst used for the process of the invention contains at least one cocatalyst and at least one metallocene of the formula I

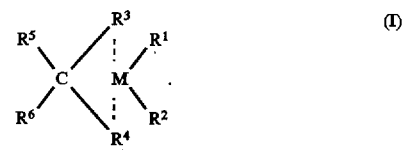

In formula I, M is preferably a metal selected from the group consisting of titanium, zirconium, hafnium, vanadium, niobium and tantalum, preferably zirconium and hafnium, particularly preferably zirconium.

$R^1$ and $R^2$ are preferably identical and are preferably each a $C_1$–$C_{10}$-alkyl group, such as methyl or ethyl, a halogen atom such as fluorine, chlorine, bromine or iodine, in particular chlorine, or a trifluoromethylsulfonic acid group.

$R^3$ and $R^4$ are identical and are preferably each a substituted cyclopentadienyl such as tetramethylcyclopentadienyl, indenyl or substituted indenyl such as isopropylindenyl, phenylindenyl or benzoindenyl.

$R^5$ and $R^6$ are identical or different and are preferably each a hydrogen atom, a $C_1$–$C_{10}$-alkyl group, a $C_1$–$C_{10}$-haloalkyl group or a $C_6$–$C_{10}$-aryl group, in particular methyl or phenyl.

Examples of metallocenes used in the process of the invention are:

methylenebis(cyclopentadienyl)zirconium dichloride,
isopropylenebis(cyclopentadienyl)zirconium dichloride,
methylphenylmethylenebis(cyclopentadienyl)zirconium dichloride, diphenylmethylenebis(cyclopentadienyl) zirconium dichloride, bis(trifluromethyl)methylenebis (cyclopentadienyl)zirconium dichloride, methyltrifluoromethylmethylenebis(cyclopentadienyl) zirconium dichloride, isopropylenebis(2,3,4,5-tetramethylcyclopentadienyl)zirconium dichloride, isopropylenebis(2,3,4,5-tetramethylcyclopentadienyl) zirconium dichloride, methylphenylmethylenebis(2,3,4,5-tetramethylcyclopentadienyl)zirconium dichloride, diphenylmethylenebis(2,3,4,5-tetramethylcyclopentadienyl)zirconium dichloride, bis(trifluoromethyl)methylenebis(2,3,4,5-tetramethylcyclopentadienyl)zirconium dichloride, methyltrifluoromethylmethylenebis(2,3,4,5-tetramethylcyclopentadienyl)zirconium dichloride, methylenebis(1-indenyl)zirconium dichloride, isopropylenebis(1-indenyl)zirconium dichloride, methylphenylmethylenebis(1-indenyl)zirconium dichloride, diphenylmethylenebis(1-indenyl)zirconium dichloride, bis(trifluoromethyl)methylenebis(1-indenyl)zirconium dichloride, methyltrifluoromethylmethylenebis(1-indenyl) zirconium dichloride, methylenebis(1-(4-phenylindenyl)) zirconium dichloride, isopropylenebis(1-(4-phenylindenyl)) zirconium dichloride, methylphenylmethylenebis(1-(4-phenylindenyl))zirconium dichloride, diphenylmethylenebis (1-(4-phenylindenyl))zirconium dichloride, bis(trifluoromethyl)methylenebis(1-(4-phenylindenyl))zirconium dichloride, methyltrifluoromethylmethylenebis(1-(4-phenylindenyl))zirconium dichloride, methylenebis(1-(4-isopropylindenyl))zirconium dichloride, isopropylenebis(1-(4-isopropylindenyl))zirconium dichloride, methylphenylmethylenebis(1-(4-isopropylindenyl))zirconium dichloride, diphenylmethylenebis(1-(4-isopropylindenyl))zirconium dichloride, bis(trifluoromethyl)methylenebis(1-(4-isopropylindenyl))zirconium dichloride, methyltrifluoromethylmethylenebis(1-(4-isopropylindenyl))zirconium dichloride, methylenebis(1-(4,5-benzoindenyl))zirconium dichloride, isopropylenebis(1-(4,5-benzoindenyl))zirconium dichloride, methylphenylmethylenebis(1-(4,5-benzoindenyl))zirconium dichloride, diphenylmethylenebis(1-(4,5-benzoindenyl))zirconium dichloride, bis(trifluoromethyl)methylenebis(1-(4,5-benzoindenyl))zirconium chloride, methyltrifluoromethylmethylenebis(1-(4,5-benzoindenyl))zirconium dichloride.

Particularly preferred metallocenes are: isopropylenebis(1-indenyl)zirconium dichloride and diphenylmethylenebis(1-indenyl)zirconium dichloride.

The cocatalyst is preferably an aluminoxane, in particular of the formula X

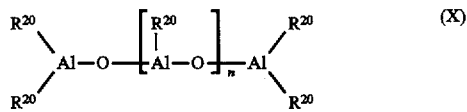

for the linear type and/or of the formula XI

for the cyclic type, where in the formulae X and XI $R^{20}$ is identical or different on each appearance and is a $C_1$–$C_6$-alkyl group, phenyl or benzyl and n is an integer from 0 to 50. The $C_1$–$C_6$-alkyl group is preferably methyl, ethyl or isobutyl, butyl or neopentyl, particularly preferably methyl. n is an integer from 0 to 50, preferably from 5 to 40.

The aluminoxane can be prepared in various ways by known processes. One of the methods is, for example, reacting an aluminum-hydrocarbon compound and/or a hydridoaluminum-hydrocarbon compound with water (gaseous, solid, liquid or bound—for example as water of crystallization) in an inert solvent (such as toluene). To prepare an aluminoxane having different alkyl groups $R^{20}$, two different trialkylaluminums ($AlR_3$+$AlR_3'$) corresponding to the desired composition are reacted with water (S. Pasynkiewics, Polyhedron 9 (1990) 429, EP-A 302 424).

The exact three-dimensional structure of the aluminoxanes is not known.

Regardless of the method of preparation, all aluminoxane solutions have in common a varying content of unreacted aluminum starting compound which is present in free form as adduct.

It is also possible to apply the aluminoxane to a support and then to use it as a suspension in supported form. A number of supporting processes are known (EP 567 952), e.g. silica gel can function as support.

It is possible to activate the metallocene with a cocatalyst, in particular an aluminoxane, prior to use in the polymerization reaction. The polymerization activity is thereby significantly increased.

The preactivation of the transition metal compound is carried out in solution. The metallocene is here preferably dissolved in a solution of the aluminoxane in an inert hydrocarbon. Suitable inert hydrocarbons are aliphatic or aromatic hydrocarbons; preference is given to using toluene.

The concentration of the aluminoxane in the solution is in the range from about 1% by weight to the saturation limit, preferably from 5 to 30% by weight, in each case based on the total solution. The metallocene can be used in the same concentration, but it is preferably used in an amount of $10^{-4}$ mol per mole of aluminoxane. The preactivation time is from 1 minute to 60 hours, preferably from 5 to 60 minutes. The preactivation is carried out at a temperature of from −78° C. to 100° C., preferably from 0° to 70° C.

The catalyst components can also be used in a prepolymerization or be applied to a support. For the prepolymerization, preference is given to using the (or one of the) olefin(s) used in the polymerization.

Suitable supports are, for example, silica gels, aluminum oxides, solid aluminoxane or other inorganic support materials. Another suitable support material is a polyolefin powder in finely divided form.

A further possible embodiment of the process of the invention comprises using, in place of or in addition to an aluminoxane, a salt-like compound of the formula $R_xNH_{4-x}BR'_4$ or the formula $R_3PHBR'_4$ as cocatalyst. Here, x=1, 2 or 3, R=alkyl or aryl, identical or different, and R=aryl which may also be fluorinated or partially fluorinated. In this case, the catalyst comprises the reaction product of a metallocene with one of the specified compounds (EP-A 277 004).

If solvent is added to the reaction mixture, this is a conventional inert solvent such as, for example, aliphatic or cycloaliphatic hydrocarbons, petroleum fractions or hydrogenated diesel oil fractions or toluene.

The metallocenes are preferably used in the form of their racemates. The metallocene compound is used in a concentration, based on the transition metal, of from $10^{-3}$ to $10^{-8}$ mol, preferably from $10^{-4}$ to $10^{-7}$ mol, of transition metal per $dm^3$ of reactor volume. The aluminoxane is used in a concentration of from $10^{-4}$ to $10^{-1}$ mol, preferably from $10^{-4}$ to $10^{-2}$ mol, per $dm^3$ of reactor volume, based on the aluminum content. However higher concentrations are also possible in principle.

The polymerization is carried out in the liquid cycloolefin itself or in cycloolefin solution. Preferably, the polymerization temperature is from −78° to 150° C. and the pressure is from 0.01 to 64 bar, in particular from 1 to 64 bar.

In the preparation of copolymers, the molar ratio of the polycyclic olefin to the open-chain olefin used can vary within a wide range. Preference is given to using molar ratios of from 3:1 to 100:1 of cycloolefin to open-chain olefin. The proportion of comonomer incorporated can be controlled to almost any value desired by selection of the polymerization temperature, the concentration of the catalyst components and the molar ratio used or the pressure of the gaseous, open-chain olefin. Preference is given to proportions of cyclic components incorporated of between 20 and 80 mol %, particularly preferably between 40 and 60 mol %.

The polymerization can also be carried out in a plurality of stages, with formation of block copolymers also being possible (EP-A-560 090).

The mean molecular weight of the polymer formed can be further controlled in a known manner by metering in of hydrogen, variation of the concentration of the catalyst components or variation of the temperature. The polydispersity $M_w/M_n$ of the cycloolefin copolymers is preferably between 1.9 and 3.5.

The process of the invention can be used to prepare amorphous cycloolefin copolymers which have a high viscosity number. Furthermore, hydrogen regulation or a variation of the polymerization temperature makes a broad range of viscosity numbers accessible. The cycloolefin copolymers prepared according to the invention have high tensile strengths and can be obtained in high space-time yields. In addition, ethylene-containing cycloolefin copolymers prepared according to the invention contain no crystalline ethylene sequences (DSC in accordance with DIN 53765) and have a high transparency. The copolymers are transparent, hard and thermoplastically processable. The tensile strengths (in accordance with DIN 53457) are preferably in the range from 50 to 100 MPa, particularly preferably between 60 and 80 MPa. The viscosity numbers (in accordance with DIN 53728, at 135° C. in decalin) are preferably in the range from 100 to 250 cm$^3$/g, in particular 150–250 cm$^3$/g. Both in extrusion and in injection molding, no decomposition reactions or viscosity degradation are found at temperatures of 300° C.

The materials prepared according to the invention are particularly suitable for producing shaped bodies such as extrusion parts, (e.g. films, hoses, pipes, rods and fibers) or injection-molded articles of any shape and size. An important property of the materials of the invention is their transparency. For this reason, the optical applications of the extruded or injection-molded parts made of these materials are of particular importance. The index of refraction, measured using an Abbe refractometer and mixed light, of the reaction products described in the following examples is in the range between 1.520 and 1.555. Since the index of refraction is very close to that of crown glass (n=1.51), the products of the invention can be used as a glass replacement in various applications such as, for example, lenses, prisms, support plates and films for optical memories, for video discs, for compact discs, as covering or focusing discs for solar cells, as covering and scattering discs for power optics, as waveguides in the form of fibers or films.

In impact-modified form, the materials of the invention can be used as a structural material in various industrial areas (EP 0 566 988).

The polymers of the invention can also be used for preparing polymer alloys. The alloys can be prepared in the melt or in solution. The alloys each have a favorable property combination of the components for a particular application. The following polymers can be used in alloys with the polymers of the invention:

polyethylene, polypropylene, (ethylene-propylene) copolymers, polybutylene, poly(4-methyl-1-pentene), polyisoprene, polyisobutylene, natural rubber, poly(methyl methacrylate), further polymethacrylates, polyacrylates, (acrylate-methacrylate) copolymers, polystyrene (styrene-acrylonitrile) copolymers, bisphenol A-polycarbonate, further polycarbonates, aromatic polyester carbonates, polyethylene terephthalate, polybutyleneterephthalate, amorphous polyarylates, nylon-6, nylon-66, further polyamides, polyaramides, polyether ketones, polyoxymethylene, polyoxyethylene, polyurethanes, polysulfones, polyether sulfones, polyvinylidene fluoride.

The glass transition temperatures ($T_g$) and melting points (mp) given in the examples and the table were determined by means of differential scanning calorimetry (DSC in accordance with DIN 53765) at a heating rate of 20° C./min. The viscosity numbers (VN) given were determined in accordance with DIN 53 728 at 135° C. in decalin. The measure used for the catalyst activity (A*) was the yield of polymer per unit time and per mmol of metallocene.

The molecular weight of the methylaluminoxane (MAO) used is 1000 g/mol and should be regarded as the average molecular weight of isolated MAO.

$$\text{Activity} = \frac{\text{Polymer [g]}}{\text{time [h]} \times \text{amount of metallocene [mmol]}}$$

EXAMPLE 1

A 1500 ml reactor which had been flushed a number of times with nitrogen was charged with 600 ml of an 85% strength by weight solution of norbornene in toluene and the solution was heated to 70° C. The solution was saturated with ethylene by repeated pressurization of the reactor with ethylene (18 bar gauge pressure). 7 ml of methylaluminoxane solution in toluene were added to the depressurized reactor in a countercurrent of ethylene and the mixture was subsequently stirred for 15 minutes. To the reaction solution as prepared were added 1.5 mg of rac-isopropylenebis(1-indenyl)zirconium dichloride which had been preactivated in 5 ml of aluminoxane solution in toluene for 15 minutes at room temperature. An ethylene pressure of 18 bar was then immediately set as quickly as possible. Polymerization was carried out while stirring at about 750 rpm for one hour at 70° C., with the ethylene pressure being kept constant at 18 bar. To end the reaction, the reactor was first vented and the reaction solution was subsequently drained into a vessel. The polymer was precipitated in 3500 ml of acetone and, after stirring for 5 minutes, filtered. The filter cake was washed a number of times alternately with 10% hydrochloric acid and acetone. It was subsequently washed to neutrality with water and, after addition of 2000 ml of acetone, filtered. The powder thus purified was dried at 80° C. at a pressure of 0.2 bar for 15 hours. After drying, 65.5 g of a colorless powder were obtained; this corresponds to an activity of 18,900 g of polymer/hour×mmol of metallocene. A viscosity number of 182 cm$^3$/g and a glass transition temperature of 134° C. were measured on the polymer. No melting point could be detected by thermal analysis.

EXAMPLE 2

Example 2 was carried out by a similar method to Example 1, but the polymerization was carried out at 90° C. and 0.2 mg of rac-isopropylenebis(1-indenyl)zirconium dichloride was used. 89.0 g of colorless powder were obtained; this corresponds to an activity of 25,700 g of polymer/hour×mmol of metallocene. A viscosity number of 148 cm$^3$/g and a glass transition temperature of 144° C. were measured on the polymer. No melting point could be detected by thermal analysis.

EXAMPLE 3

Example 3 was carried out using a similar method to Example 1, but the polymerization was carried out at 12 bar gauge pressure of ethylene and 1.5 mg of rac-isopropylenebis(1-indenyl)zirconium dichloride were used.

79.4 g of colorless powder were obtained; this corresponds to an activity of 22,900 g of polymer/hour×mmol of metallocene. A viscosity number of 171 cm$^3$/g and a glass transition temperature of 160° C. were measured on the polymer. No melting point could be detected by thermal analysis.

TABLE

Properties of COCs from Examples 1, 2 and 3; tensile test (DIN 53457, Instron 4320)

|  | Polymer from Example 1 | Polymer from Example 2 | Polymer from Example 3 |
|---|---|---|---|
| Tensile strength [Mpa] | 67.9 | 67.3 | 71.7 |
| Elongation at break [%] | 3.62 | 3.59 | 3.62 |
| VN [cm³/g] | 182. | 148 | 171 |
| $T_g$ [°C.] | 134 | 144 | 160 |

COMPARATIVE EXAMPLE 1

Example 1 was repeated using 5.0 mg of rac-dimethylsilylbis(1-indenyl)zirconium dichloride.

After drying, 54.0 g of colorless powder were obtained; this corresponds to an activity of 4840 g of polymer/hour× mmol of metallocene. A viscosity number of 173 cm³/g was measured on the polymer. A glass transition at 137° C. and a melting point at 124° C. were able to be detected by thermal analysis.

We claim:

1. A process for preparing a cycloolefin copolymer containing no crystalline ethylene sequences by polymerization of at least one cycloolefin and at least one acyclic olefin in the presence of a catalyst comprising at least one cocatalyst and at least one metallocene of the formula (I)

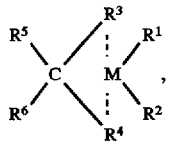

where M is Zr,

R¹ and R² are identical or different and are each a halogen atom, R³ and R⁴ are identical and are each a cyclopentadienyl or substituted cyclopentadienyl, indenyl or substituted indenyl, and R⁵ and R⁶ are identical or different and are each a methyl group on phenyl group and where the metallocene of the formula (I) is in the form of its racemate.

2. The process as claimed in claim 1, where, in the metallocene of the formula (I), R¹ and R² are identical and are each chlorine, and R⁵ and R⁶ are identical or different and are each a methyl group or phenyl group.

3. The process as claimed in claim 1, where the cocatalyst is an aluminoxane.

4. The process as claimed in claim 1, where at least one polycyclic olefin and at least one acyclic olefin are polymerized.

5. The process as claimed in claim 4, wherein from 0.1 to 99.9% by weight, based on the total amount of monomers, of at least one polycyclic olefin of the formulae II, III, IV, V, VI or VII

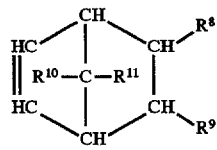

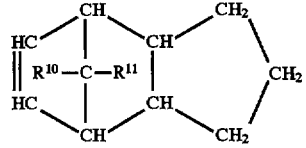

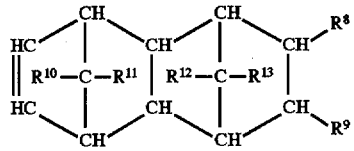

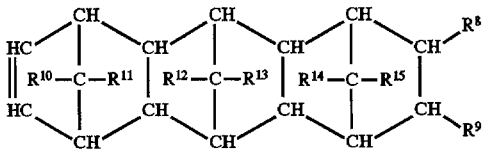

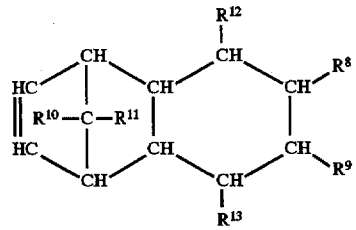

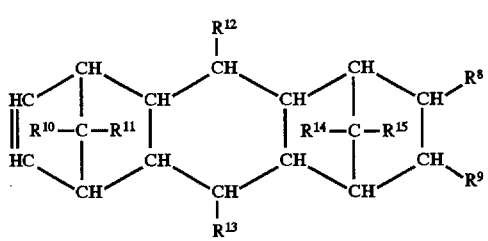

is used, where R⁸, R⁹, R¹⁰, R¹¹, R¹², R¹³, R¹⁴ and R¹⁵ are identical or different and are each a hydrogen atom or a C₁–C₂₀-hydrocarbon radical, with identical radicals in the various formulae being able to have different meanings, and from 0.1 to 99.9% by weight, based on the total amount of monomers, of at least one acyclic olefin of the formula IX

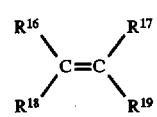

is used, where R¹⁶, R¹⁷, R¹⁸, and R¹⁹ are identical or different and are each a hydrogen atom or a C₁–C₂₀-hydrogen radical.

6. The process as claimed in claim 5, wherein from 0 to 99.9% by weight, based on the total amount of monomers, of monocycloolefin of the formula VIII

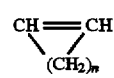

is used, where n is a number from 2 to 10.

7. The process as claimed in claim 5, wherein copolymers of polycyclic olefins of the formulae II and IV with ethylene are prepared.

8. The process as claimed in claim 5, wherein copolymers of polycyclic olefins selected from the group consisting of norbornene and tetracyclododecene with ethylene are prepared.

9. The process as claimed in claim 1, wherein the metallocene is selected from the group consisting of isopropylenebis(1-indenyl)zirconium dichloride and diphenylmethylenebis(1-indenyl)zirconium dichloride.

10. The process as claimed in claim 1, wherein the cocatalyst is of the formula X

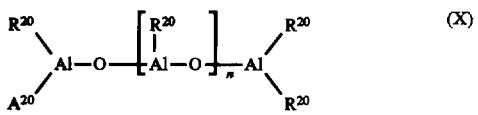

for the linear type and/or of the formula XI

for the cyclic type, where in the formulae X and XI, $R^{20}$ is identical or different on each appearance and is a $C_1$–$C_6$-alkyl group, phenyl or benzyl and n is an integer from 0 to 50.

11. The process as claimed in claim 1, wherein the polymerization is carried out in the liquid cycloolefin itself or in cycloolefin solution, the polymerization temperature is from −78° to 150° C. and the pressure is from 0.01 to 64 bar.

* * * * *